United States Patent
Wu

(10) Patent No.: US 10,327,280 B2
(45) Date of Patent: Jun. 18, 2019

(54) DEVICE AND METHOD OF HANDLING A STATE MISMATCH IN A WIRELESS COMMUNICATION SYSTEM

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 15/885,840

(22) Filed: Feb. 1, 2018

(65) Prior Publication Data

US 2018/0220487 A1   Aug. 2, 2018

Related U.S. Application Data

(60) Provisional application No. 62/453,528, filed on Feb. 2, 2017.

(51) Int. Cl.
  *H04W 36/08* (2009.01)
  *H04W 48/20* (2009.01)
  *H04W 76/27* (2018.01)

(52) U.S. Cl.
  CPC ............ *H04W 76/27* (2018.02); *H04W 36/08* (2013.01); *H04W 48/20* (2013.01)

(58) Field of Classification Search
  CPC ... H04W 76/15; H04W 76/27; H04W 74/083; H04W 36/0016; H04W 36/08; H04W 36/30; H04W 48/20; H04W 64/006; H04W 60/04; H04L 29/08
  See application file for complete search history.

(56) References Cited

U.S. PATENT DOCUMENTS

| | | | |
|---|---|---|---|
| 2013/0215834 A1* | 8/2013 | Deivasigamani | H04W 76/27 370/329 |
| 2013/0260758 A1* | 10/2013 | Zhao | H04W 36/14 455/436 |
| 2017/0196025 A1* | 7/2017 | Chien | H04W 74/0833 |
| 2018/0213452 A1* | 7/2018 | Kim | H04W 36/0033 |
| 2018/0220320 A1* | 8/2018 | Koskinen | H04W 76/27 |
| 2019/0053130 A1* | 2/2019 | Guo | H04B 7/0626 |

OTHER PUBLICATIONS

Ericsson, "RRC state machine and RRC_INACTIVE characteristics", 3GPP TSG-RAN WG2 adhoc,Tdoc R2-1700535, Spokanen USA, pp. 1-11 (Jan. 17-19, 2017).*

(Continued)

*Primary Examiner* — Afsar M Qureshi
(74) *Attorney, Agent, or Firm* — Winston Hsu

(57) ABSTRACT

A communication device of handling a state mismatch comprises a storage device and a processing circuit coupled to the storage device. The storage device stores, and the processing circuit is configured to execute instructions of entering a RRC_INACTIVE state in response to a first radio resource control (RRC) message; transmitting a second RRC message to a network, when receiving a first paging message comprising a first temporary identity (ID), wherein the second RRC message is used for requesting an establishment of a connection; and transmitting a third RRC message to the network, when receiving a second paging message comprising a second temporary ID, wherein the third RRC message is used for requesting a resumption of the connection.

13 Claims, 6 Drawing Sheets

(56) References Cited

OTHER PUBLICATIONS

3GPP TS 36.331 V14.1.0 (Dec. 2016) Technical Specification 3rd Generation Partnership Project; Technical Specification Group Radio Access Network; Evolved Universal Terrestrial Radio Access (E-UTRA); Radio Resource Control (RRC); Protocol specification (Release 14).
3GPP TS 24.301 V14.2.0 (Dec. 2016) Technical Specification 3rd Generation Partnership Project; Technical Specification Group Core Network and Terminals; Non-Access-Stratum (NAS) protocol for Evolved Packet System (EPS); Stage 3 (Release 14).
Ericsson, "RRC state machine and RRC_INACTIVE characteristics", 3GPP TSG-RAN WG2 adhoc, Tdoc R2-1700535, Spokane USA, Jan. 17-19, 2017, pp. 1-11.
NTT Docomo, Inc., "UE state transition diagram for NR", 3GPP TSG-RAN WG2 #96, R2-168077, Revision of R2-167136, Nov. 14-18, 2016, Reno, USA, pp. 1-7.
Samsung, "NR RRC state machine, transitions and signalling procedures", 3GPP TSG-RAN WG2 Meeting#96, R2-167494, Reno, USA, Nov. 14-18, 2016.
Intel Corporation, "Details on the NR_RRC_INACTIVE state", 3GPP TSG RAN WG2 Meeting#96, R2-168523, Reno, USA, Nov. 14-18, 2016.
Office action dated Oct. 11, 2018 for the Taiwan application No. 107103745, filed Feb. 2, 2018, pp. 1-14.

\* cited by examiner

DEVICE AND METHOD OF HANDLING A STATE MISMATCH IN A WIRELESS COMMUNICATION SYSTEM

CROSS REFERENCE TO RELATED APPLICATIONS

This application claims the benefit of U.S. Provisional Application No. 62/453,528 filed on Feb. 2, 2017, which is incorporated herein by reference.

BACKGROUND OF THE INVENTION

1. Field of the Invention

The present invention relates to a device and a method used in a wireless communication system, and more particularly, to a device and a method of handling a state mismatch in a wireless communication System.

2. Description of the Prior Art

When a UE communicates with a base station (BS), the UE may operate in one of multiple states. Due to situations such as that a procedure is not completed, the UE may operate in a first state while the BS determines that the UE is in a second state. Mismatch of the understanding of the state cause the BS to communicate with the UE incorrectly. Performance of the UE and the BS is degraded. Thus, the mismatch of the state is an important to be solved.

SUMMARY OF THE INVENTION

The present invention therefore provides a communication device and method for handling a state mismatch to solve the abovementioned problem.

A communication device of handling a state mismatch comprises a storage device and a processing circuit coupled to the storage device. The storage device stores, and the processing circuit is configured to execute instructions of entering a RRC_CONNECTED state in a radio resource control (RRC) layer of the communication device and a MM-CONNECTED state in a Mobility Management (MM) layer of the communication device; receiving a first temporary identity (ID) of a non-access stratum (NAS) layer in a MM message from a network; receiving a first RRC message from the network, wherein the first RRC message configures the communication device to enter a RRC_INACTIVE state and includes a second temporary ID for resuming a connection between the communication device and the network; entering the RRC_INACTIVE state in response to the first RRC message; transmitting a second RRC message to the network, when receiving a first paging message comprising the first temporary ID, wherein the second RRC message is used for requesting an establishment of the connection; and transmitting a third RRC message to the network, when receiving a second paging message comprising the second temporary ID, wherein the third RRC message is used for requesting a resumption of the connection.

A communication device of handling a state mismatch comprises a storage device and a processing circuit coupled to the storage device. The storage device stores, and the processing circuit is configured to execute instructions of entering a RRC_CONNECTED state in a RRC layer of the communication device and a MM-CONNECTED state in a MM layer of the communication device; receiving a first RRC message from the network in the RRC_CONNECTED state, wherein the first RRC message configures the communication device to enter a RRC_INACTIVE state; entering the RRC_INACTIVE state in response to the first RRC message; initiating a RRC resume procedure in the RRC_INACTIVE state via a first cell of the network by the RRC layer, wherein the RRC resume procedure is used for resuming a connection between the communication device and the network; performing a cell reselection to a second cell of the network when initiating the RRC procedure; indicating a failure to resume the connection to the MM layer by the RRC layer in response to the cell reselection; and maintaining the MM-CONNECTED state in the MM layer in response to the failure.

A communication device of handling a state mismatch comprises a storage device and a processing circuit coupled to the storage device. The storage device stores, and the processing circuit is configured to execute the instructions of entering a RRC_CONNECTED state in a RRC layer of the communication device and a MM-CONNECTED state in a MM layer of the communication device; receiving a first RRC message from the network, wherein the first RRC message configures the communication device to enter a RRC_INACTIVE state; entering the RRC_INACTIVE state in response to the first RRC message; initiating a RRC resume procedure in the RRC_INACTIVE state via a first cell of the network by the RRC layer, wherein the RRC resume procedure is used for resuming a connection between the communication device and the network; determining that the first cell is barred for initiating the RRC resume procedure; indicating a failure to resume the connection to an upper layer by the RRC layer in response to the determination; and maintaining the MM-CONNECTED state in response to the failure.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
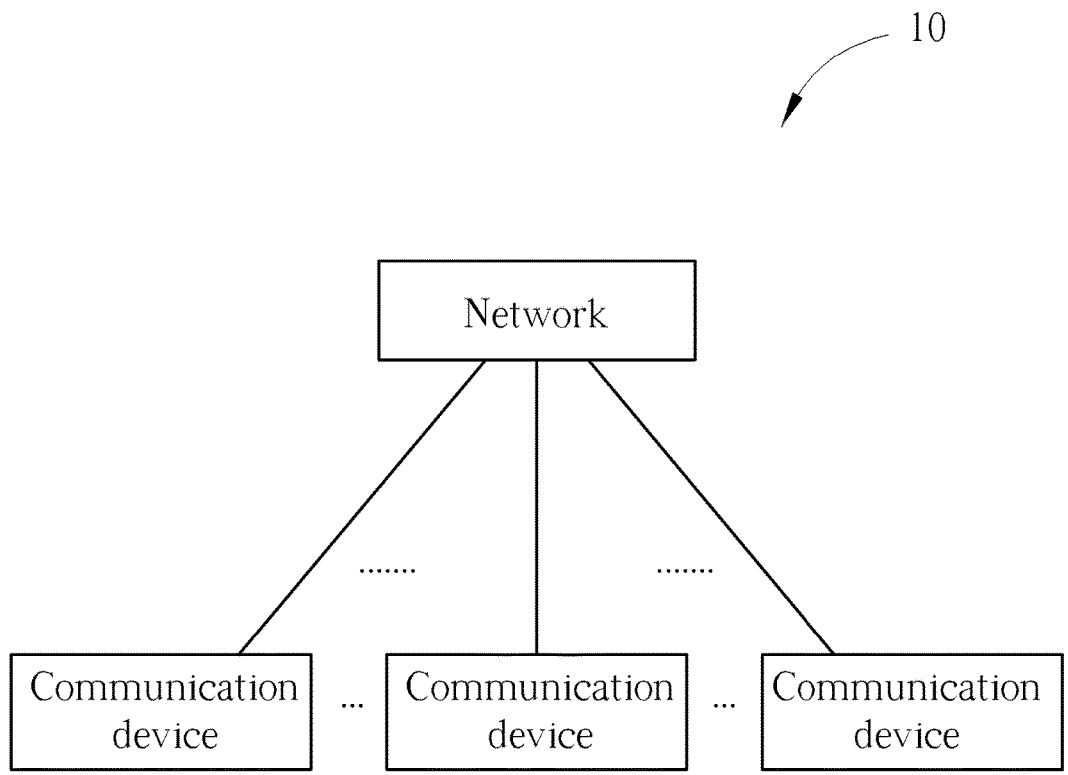
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. The network and a communication device may communicate with each other via one or more carriers of licensed band(s) and/or unlicensed band(s). The network and the communication device may simultaneously communicate with each other via one or multiple cells (e.g., multiple carriers) belonging to one or multiple base stations (BSs).

In FIG. 1, the network and the communication devices are simply utilized for illustrating the structure of the wireless communication system 10. Practically, the network includes an evolved universal terrestrial radio access network (E-UTRAN) and/or a 5G radio access network (RAN). The E-UTRAN includes at least one evolved Node-B (eNB), and the 5G RAN includes at least one 5G base station (BS) (or called gNB or evolved LTE eNB). The network may include an evolved packet core (EPC) network and/or a 5G core network (5GC). The EPC network includes a mobility management entity (MME) and a serving gateway. The 5GC includes an Access and Mobility Management Function, a Session Management Function, a User Plane Function and an Authentication Server Function.

A communication device may be a user equipment (UE), a mobile phone, a laptop, a tablet computer, an electronic book, a portable computer system, a vehicle, a ship or an aircraft. In addition, the network and the communication device can be seen as a transmitter or a receiver according to a direction of a transmission (i.e., transmission direction), e.g., for an uplink (UL), the communication device is the transmitter and the network is the receiver, and for a downlink (DL), the network is the transmitter and the communication device is the receiver.

Figure 2:
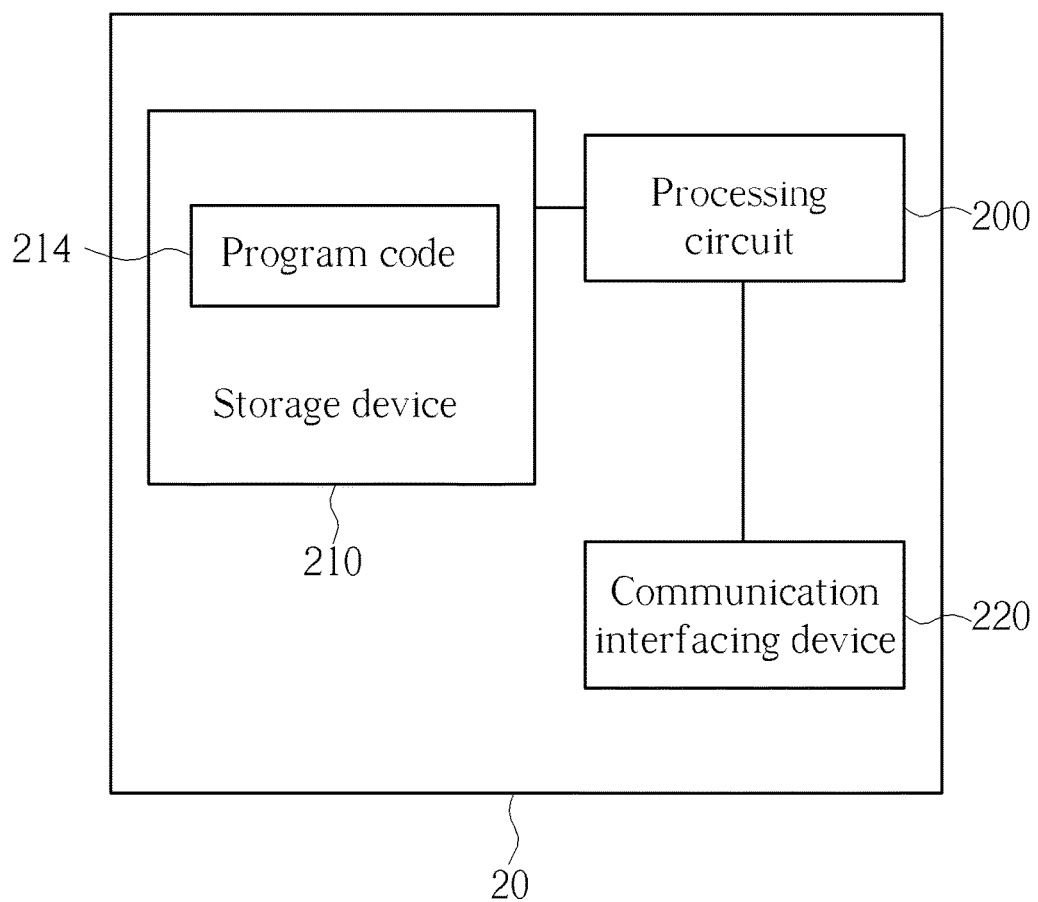
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include a processing circuit 200 such as a microprocessor or Application Specific Integrated Circuit (ASIC), a storage device 210, a communication interfacing device 220 and a communication interfacing device 240. The storage device 210 may be any data storage device that may store a program code 214, accessed and executed by the processing circuit 200. Examples of the storage device 210 include but are not limited to a subscriber identity module (SIM), read-only memory (ROM), flash memory, random-access memory (RAM), hard disk, optical data storage device, non-volatile storage unit, non-transitory computer-readable medium (e.g., tangible media), etc. The communication interfacing devices 220 and 240 are preferably are transceivers used to transmit and receive signals (e.g., data, messages and/or packets) according to processing results of the processing circuit 200.

In the following examples, a UE is used to represent a communication device in FIG. 1, to simplify the illustration of the embodiments.

A UE may enter a RRC_INACTIVE state. To simplify the following description, the RRC_INACTIVE state represents either a RRC_CONNECTED state with a light connection in a long-term evolution (LTE) system (e.g., 4G system) or a RRC_INACTIVE state in a new radio (NR) system (e.g., 5G system).

In a first state mismatch scenario, the UE is a RRC_INACTIVE state while the network thinks that the UE is in a RRC_IDLE state. The first mismatch scenario may occur, when the network does not have a UE context of the UE due to a reset. In this case, the network may transmit a paging message to the UE, and the UE transmits a RRC message to resume a connection with the network in response to the paging message. However, the network rejects to the resumption of the connection.

Figure 3:
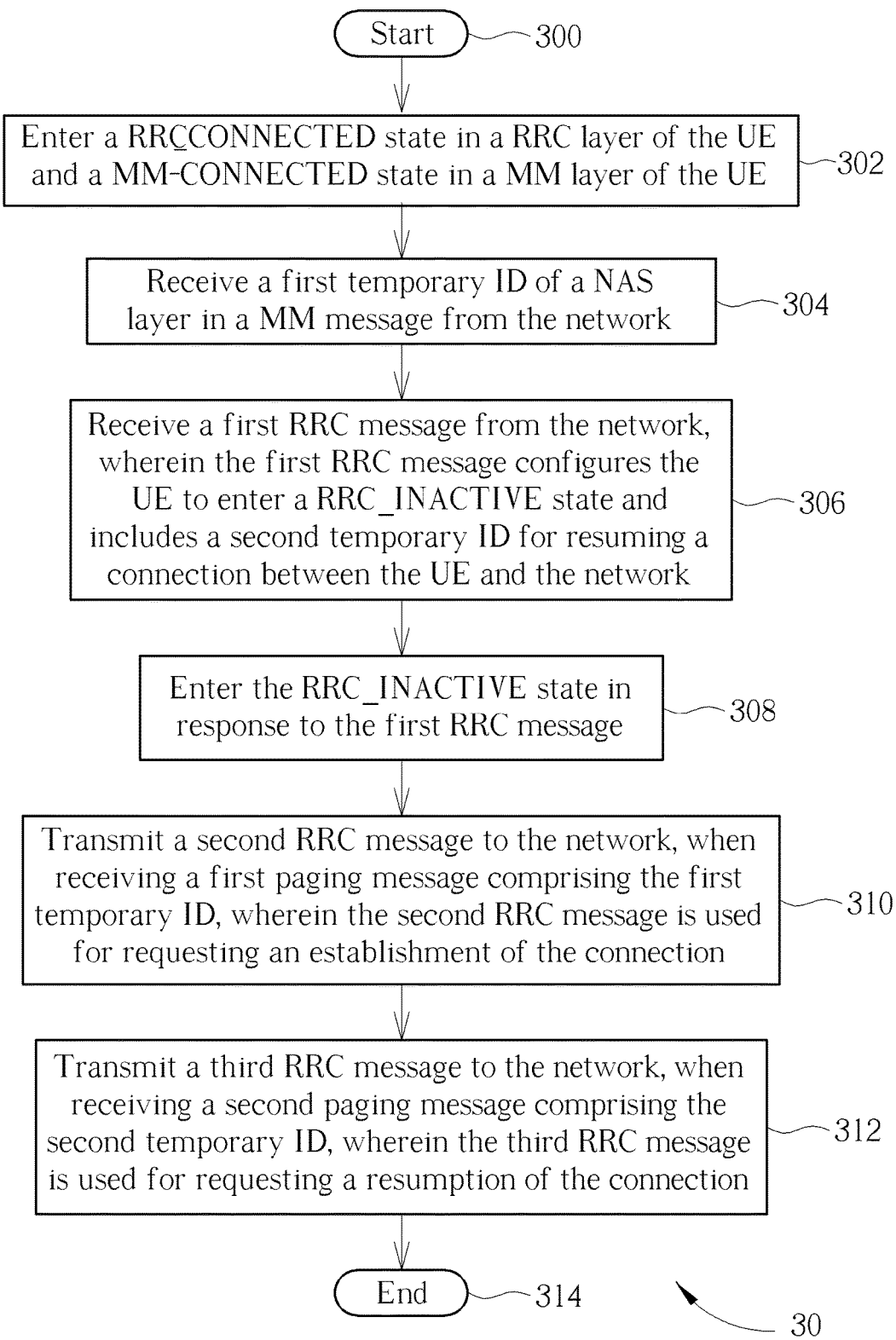
FIG. 3 is a flowchart of a process according to an example of the present invention.

A process 30 in FIG. 3 may be utilized in a UE, and includes the following steps:
Step 300: Start.
Step 302: Enter a RRC_CONNECTED state in a radio resource control (RRC) layer of the UE and a MM-CONNECTED state in a Mobility Management (MM) layer of the UE.
Step 304: Receive a first temporary identity (ID) of a non-access stratum (NAS) layer in a MM message from the network.
Step 306: Receive a first RRC message from the network, wherein the first RRC message configures the UE to enter a RRC_INACTIVE state and includes a second temporary ID for resuming a connection between the UE and the network.
Step 308: Enter the RRC_INACTIVE state in response to the first RRC message.
Step 310: Transmit a second RRC message to the network, when receiving a first paging message comprising the first temporary ID, wherein the second RRC message is used for requesting an establishment of the connection.
Step 312: Transmit a third RRC message to the network, when receiving a second paging message comprising the second temporary ID, wherein the third RRC message is used for requesting a resumption of the connection.
Step 314: End.

The first RRC message may be a RRCConnectionRelease message. The second RRC message may be a RRCConnectionRequest message and the third RRC message may be a RRCConnectionResumeRequest message.

In one example, the first temporary ID is a NAS layer ID, e.g., a S-Temporary Mobile Subscriber Identity (S-TMSI) (e.g. configured by a NAS layer). In one example, the second temporary ID is an Access Stratum (AS) ID (e.g., configured by a RRC layer), e.g., resume ID. In one example, the connection includes a RRC connection and/or a data radio bearer (DRB).

In one example, when the UE in the RRC_INACTIVE state receives the first paging message including the first temporary ID, the UE transfers to a RRC_IDLE state from the RRC_INACTIVE state. In response to the transfer to the RRC_IDLE state from the RRC_INACTIVE state, the UE may release the second temporary ID. In one example, the UE also releases an AS context of the UE. The AS context may include RRC configuration(s).

In a second state mismatch scenario, the UE is in a RRC_IDLE state while the network thinks that the UE is in a RRC_INACTIVE state. The UE in the RRC_INACTIVE state may enter the RRC_IDLE state due to an event occurred in the UE. The event may be that the UE in the RRC_INACTIVE state performs a cell reselection to a second cell while performing a RRC connection resume procedure or a timer (e.g., T300) is running.

Figure 4:
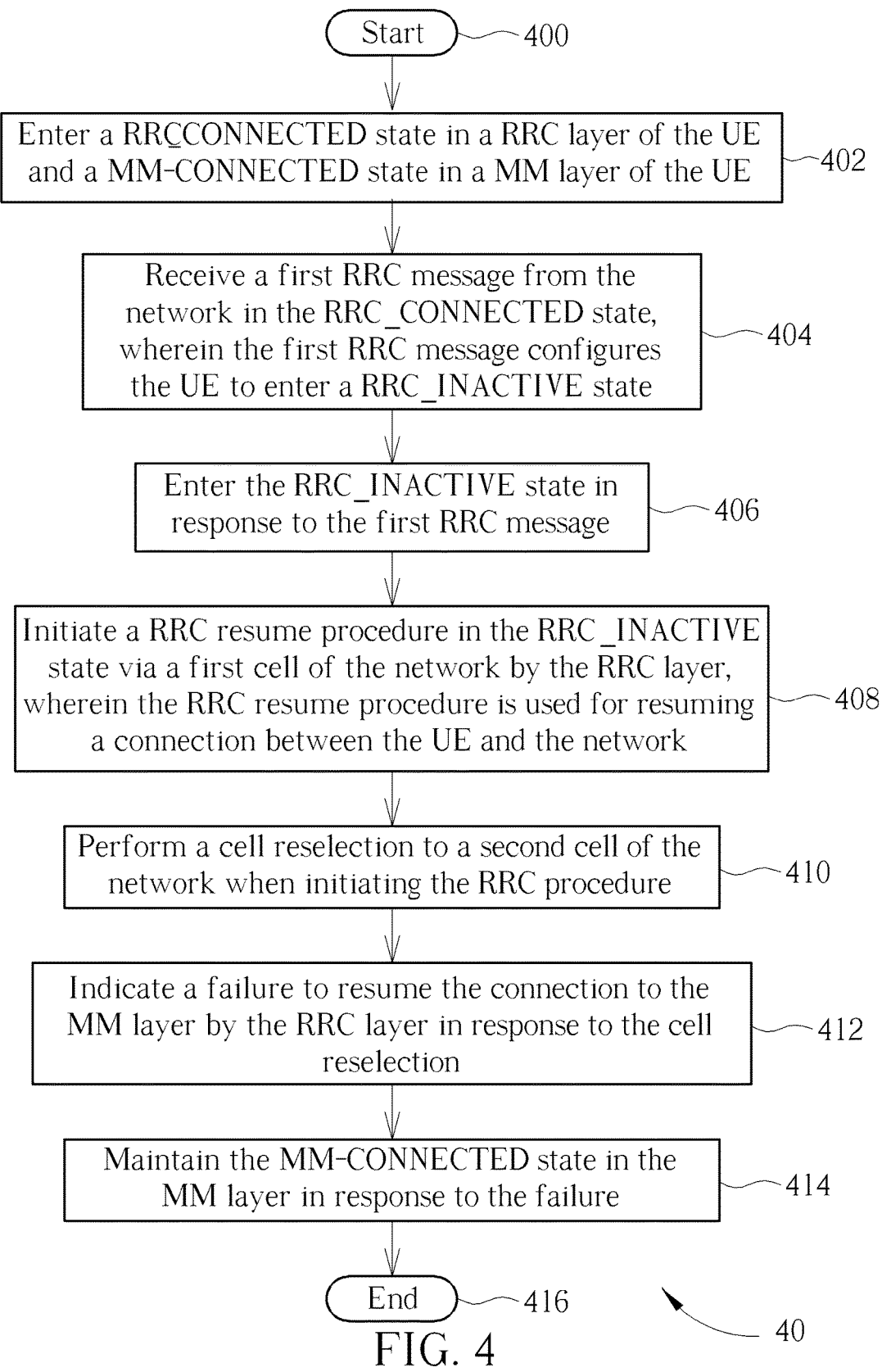
FIG. 4 is a flowchart of a process according to an example of the present invention.

A process 40 in FIG. 4 may be utilized in a UE, and includes the following steps:
Step 400: Start.
Step 402: Enter a RRC_CONNECTED state in a RRC layer of the UE and a MM-CONNECTED state in a MM layer of the UE.
Step 404: Receive a RRC message from the network in the RRC_CONNECTED state, wherein the RRC message configures the UE to enter a RRC_INACTIVE state.
Step 406: Enter the RRC_INACTIVE state in response to the RRC message.
Step 408: Initiate a RRC resume procedure in the RRC_INACTIVE state via a first cell of the network by the RRC layer, wherein the RRC resume procedure is used for resuming a connection between the UE and the network.
Step 410: Perform a cell reselection to a second cell of the network when initiating the RRC procedure.

Step 412: Indicate a failure to resume the connection to the MM layer by the RRC layer in response to the cell reselection.

Step 414: Maintain the MM-CONNECTED state in the MM layer in response to the failure.

Step 416: End.

In a third state mismatch scenario, the UE is in a MM-IDLE state while the network thinks that the UE is in a MM-CONNECTED state. For example, the UE in the MM_CONNECTED state and the RRC_INACTIVE state camps on a cell and determines the cell is barred during a access barring check of a service specific access control (SSAC). The UE may perform the access barring check, when initiating a mobile originating Multimedia Telephony (MMTEL) voice call, a mobile originating MMTEL video call, a mobile originating Short Message Service (SMS) or a mobile originating SMS over Internet Protocol (IP). When the UE determines that the cell is barred, a RRC layer of the UE indicates a failure to resume a RRC connection with suspend indication to a NAS layer of the UE. Then, the UE enters the MM-IDLE state. However, the network does not know the access barring check performed by the UE, since the access barring check is done by the UE without being singled to the network. Therefore, the network does not know that the UE has entered the MM-IDLE state.

Figure 5:
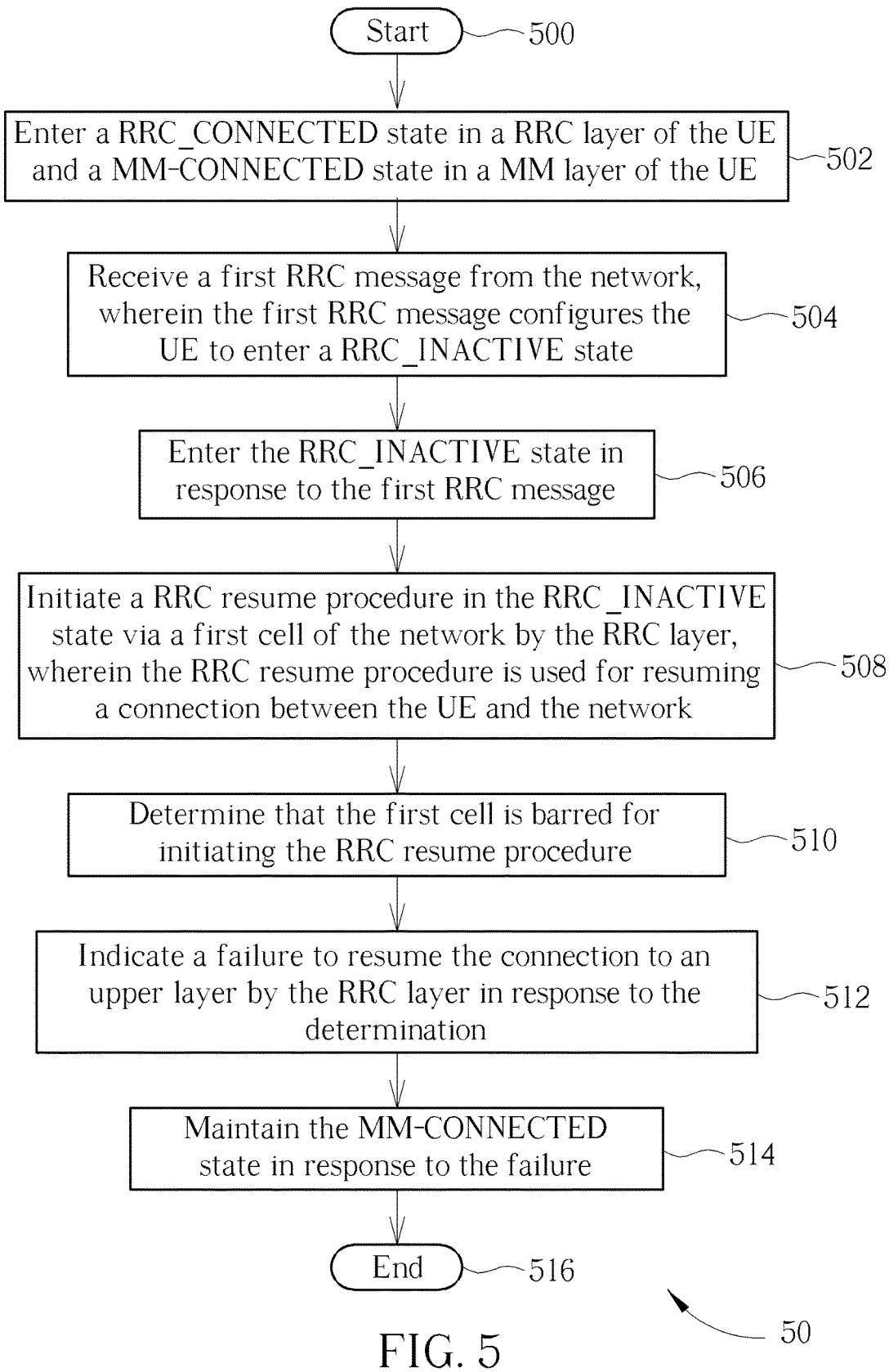
FIG. 5 is a flowchart of a process according to an example of the present invention.

A process 50 in FIG. 5 may be utilized in a UE, and includes the following steps:

Step 500: Start.

Step 502: Enter a RRC_CONNECTED state in a RRC layer of the UE and a MM-CONNECTED state in a MM layer of the UE.

Step 504: Receive a RRC message from the network, wherein the RRC message configures the UE to enter a RRC_INACTIVE state.

Step 506: Enter the RRC_INACTIVE state in response to the RRC message.

Step 508: Initiate a RRC resume procedure in the RRC_INACTIVE state via a first cell of the network by the RRC layer, wherein the RRC resume procedure is used for resuming a connection between the UE and the network.

Step 510: Determine that the first cell is barred for initiating the RRC resume procedure.

Step 512: Indicate a failure to resume the connection to an upper layer by the RRC layer in response to the determination.

Step 514: Maintain the MM-CONNECTED state in response to the failure.

Step 516: End.

The following examples may be applied to the processes 40-50.

In one example, the RRC layer sends an indication indicating the failure to the MM layer. When the MM layer receives the indication, the MM layer does not change a MM state from the MM-CONNECTED state to another state. Thus, the UE does not change the MM state to the MM IDLE state to avoid unnecessary exchange of messages with the CN to go back to the MM_CONNECTED state.

Figure 6:
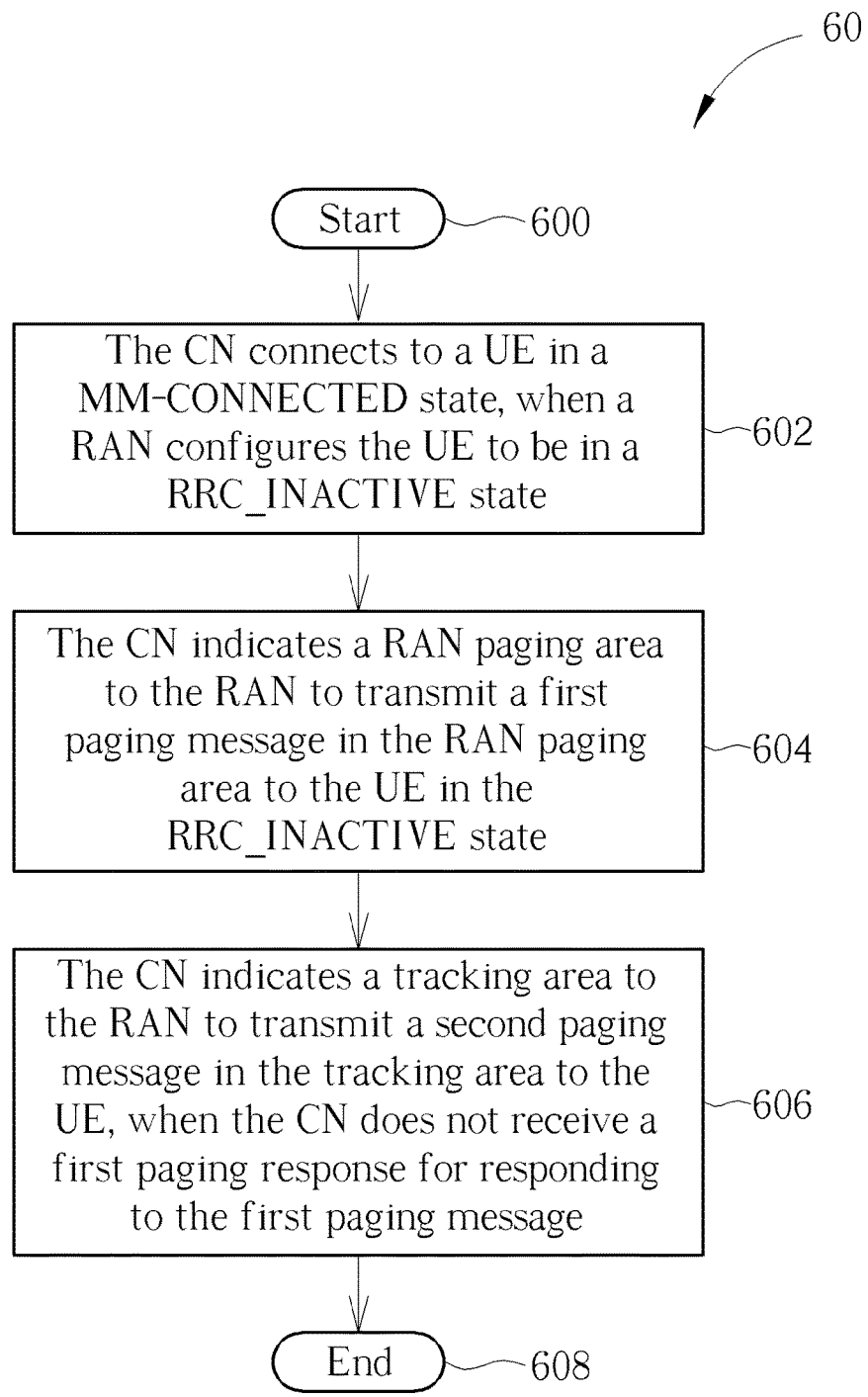
FIG. 6 is a flowchart of a process according to an example of the present invention.

A process 60 in FIG. 6 may be utilized in a core network (CN) (e.g., in the network in FIG. 1), and includes the following steps:

Step 600: Start.

Step 602: The CN connects to a UE in a MM-CONNECTED state, when a RAN configures the UE to be in a RRC_INACTIVE state.

Step 604: The CN indicates a RAN paging area to the RAN to transmit a first paging message in the RAN paging area to the UE in the RRC_INACTIVE state.

Step 606: The CN indicates a tracking area to the RAN to transmit a second paging message in the tracking area to the UE, when the CN does not receive a first paging response for responding to the first paging message.

Step 608: End.

According to the process 60, a different area (e.g., larger area) is used, if the paging response is not received.

In one example, the UE in a RRC_INACTIVE state fails to transmit data (e.g., medium access control (MAC) message, radio link control (RLC) or packet data convergence protocol (PDCP) protocol data unit (PDU), or RRC message) within a time period. After the time period, the UE enters the RRC_IDLE state and a MM IDLE state, but the RAN and the CN do not know the change of the UE's state.

In one example, the RAN configures the UE to enter the RRC_INACTIVE state by transmitting a RRC message to the UE. The RRC message indicates the UE to enter the RRC_INACTIVE state, and configures the RAN paging area. The UE may register to (or is configured) the tracking area with (or by) the CN in a NAS procedure (e.g., attach procedure, tracking area update procedure or registration procedure).

In one example, the RAN transmits information of the RAN paging area to the CN, when the RAN configures the UE to enter the RRC_INACTIVE state. That is, the CN receives the information of the RAN paging area from the RAN. In another example, the CN transmits the information to the RAN.

Realizations of the processes 30-60 are not limited to the above description. The following examples may be applied to the processes 30-60.

In one example, a RRC message configuring the UE to enter the RRC_INACTIVE state may include a temporary ID (e.g., resume ID) used in a RRC layer for a UE to receive a paging message, to transmit data, or to transmit a RRC-ConnectionResumeRequest message in a RRC connection resume procedure. For example, the UE may include the temporary ID in a MAC PDU including an IP packet transmitted to the network. The UE may include the temporary ID in the RRCConnectionResumeRequest message requesting the resumption of the connection. The UE enters the RRC_INACTIVE state, and keeps a RRC configuration and a security context in response to the RRC message. The RRC message may be an RRCConnectionRelease message.

If the RRCConnectionRelease message does not indicate the UE to enter the RRC_INACTIVE state, the UE enters the RRC_IDLE state and releases the RRC configuration and the security context. In this case, the RRCConnectionRelease message does not include the temporary ID.

In one example, the UE transmits a hybrid automatic repeat request (HARQ) acknowledgement acknowledging a MAC PDU including the RRC message or a RLC acknowledgement acknowledging a RLC PDU including the RRC message. In one example, the UE transmits a RRC response message for responding to the RRC message to the network. The network considers that the UE enters the RRC_INACTIVE state, when transmitting the RRC message or receiving the HARQ acknowledgement, the RLC acknowledgement or the RRC response message.

Those skilled in the art should readily make combinations, modifications and/or alterations on the abovementioned description and examples. For example, the skilled person easily makes new embodiments of the network based on the embodiments and examples of the UE, and makes new embodiments of the UE based on the embodiments and examples of the network. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the above processes and examples above may be compiled into the program code 214.

To sum up, the present invention provides a method and a communication device for handling a state mismatch. The communication device and the network can have the same understanding of a state of the communication device according to the present invention. Thus, the mismatch of the state is solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device of handling a state mismatch, comprising:
   a storage device memory; and
   a processing circuit, coupled to the storage device memory, wherein the storage device memory stores instructions, and the processing circuit is configured to execute the instructions of:
   entering a RRC_CONNECTED state in a radio resource control (RRC) layer of the communication device and a MM-CONNECTED state in a Mobility Management (MM) layer of the communication device;
   receiving a first temporary identity (ID) of a non-access stratum (NAS) layer in a MM message from a network;
   receiving a first RRC message from the network, wherein the first RRC message configures the communication device to enter a RRC_INACTIVE state and includes a second temporary ID for resuming a connection between the communication device and the network;
   entering the RRC_INACTIVE state in response to the first RRC message;
   transmitting a second RRC message to the network, when receiving a first paging message comprising the first temporary ID, wherein the second RRC message is used for requesting an establishment of the connection; and
   transmitting a third RRC message to the network, when receiving a second paging message comprising the second temporary ID, wherein the third RRC message is used for requesting a resumption of the connection.

2. The communication device of claim 1, wherein the first temporary ID is a NAS layer ID.

3. The communication device of claim 1, wherein the second temporary ID is a RRC layer ID.

4. The communication device of claim 1, wherein the connection comprise a RRC connection and/or a data radio bearer (DRB).

5. The communication device of claim 1, wherein the instructions further comprise:
   transferring to a RRC_IDLE state from the RRC_INACTIVE state, when the communication device in the RRC_INACTIVE state receives the first paging message comprising the first temporary ID.

6. The communication device of claim 5, wherein instructions further comprise:
   releasing the second temporary ID.

7. The communication device of claim 5, wherein the instructions further comprise:
   releasing a Access Stratum (AS) context of the communication device.

8. A communication device of handling a state mismatch, comprising:
   a storage device memory; and
   a processing circuit, coupled to the storage device memory, wherein the storage device memory stores instructions, and the processing circuit is configured to execute the instructions of:
   entering a RRC_CONNECTED state in a radio resource control (RRC) layer of the communication device and a MM-CONNECTED state in a Mobility Management (MM) layer of the communication device;
   receiving a RRC message from the network in the RRC_CONNECTED state, wherein the RRC message configures the communication device to enter a RRC_INACTIVE state;
   entering the RRC_INACTIVE state in response to the RRC message;
   initiating a RRC resume procedure in the RRC_INACTIVE state via a first cell of the network by the RRC layer, wherein the RRC resume procedure is used for resuming a connection between the communication device and the network;
   performing a cell reselection to a second cell of the network when initiating the RRC procedure;
   indicating a failure to resume the connection to the MM layer by the RRC layer in response to the cell reselection; and
   maintaining the MM-CONNECTED state in the MM layer in response to the failure.

9. The communication device of claim 8, wherein the RRC message comprises a temporary identity (ID) used in the RRC layer.

10. The communication device of claim 8, wherein the instructions further comprise:
    transmitting a RRC response message for responding to the RRC message to the network.

11. A communication device of handling a state mismatch, comprising:
    a storage device memory; and
    a processing circuit, coupled to the storage device memory, wherein the storage device memory stores instructions, and the processing circuit is configured to execute the instructions of:
    entering a RRC_CONNECTED state in a radio resource control (RRC) layer of the communication device and a MM-CONNECTED state in a Mobility Management (MM) layer of the communication device;
    receiving a RRC message from the network, wherein the RRC message configures the communication device to enter a RRC_INACTIVE state;
    entering the RRC_INACTIVE state in response to the RRC message;
    initiating a RRC resume procedure in the RRC_INACTIVE state via a first cell of the network by the RRC layer, wherein the RRC resume procedure is used for resuming a connection between the communication device and the network;
    determining that the first cell is barred for initiating the RRC resume procedure;
    indicating a failure to resume the connection to an upper layer by the RRC layer in response to the determination; and maintaining the MM-CONNECTED state in response to the failure.

12. The communication device of claim 11, wherein the RRC message comprises a temporary identity (ID) used in the RRC layer.

13. The communication device of claim 11, wherein the instructions further comprise:
   transmitting a RRC response message for responding to the RRC message to the network.

* * * * *